United States Patent Office 3,515,580
Patented June 2, 1970

3,515,580
UREA/SALT OF AN ACID COMPLEX AND A WETTING AGENT - ANTISTATIC COMPOSITION FOR SYNTHETIC POLYMERS
Frank E. Eastes, Spartanburg, S.C., assignor to W. R. Grace & Co., Duncan, S.C., a corporation of Connecticut
No Drawing. Filed Apr. 6, 1967, Ser. No. 628,836
Int. Cl. B44d 5/00; C09d 5/24
U.S. Cl. 117—138.8
13 Claims

ABSTRACT OF THE DISCLOSURE

An admixture of urea and a salt of an acid with a wetting agent in a liquid dispersing agent is provided as an antistatic agent and coated on synthetic polymer surfaces such as polypropylene film to provide a product of synthetic polymer with a coating of the urea and salt with the wetting agent.

---

This invention relates to a composition useful for reducing the propensity of polymeric surfaces to accumulate static electrical charges. In one aspect, the invention relates to a method for reducing the accumulation of a static electrical charge on a polymer surface. In another aspect, the invention relates to a polymeric article coated with an antistatic composition.

A large number of organic thermoplastic polymeric materials have been discovered which are useful for a variety of purposes such as films, filaments, tubes, rods, bars, and the like. One disadvantage of many of these polymers is that they have a high electrostatic propensity, that is, they are highly susceptible to the accumulation of a static electrical charge. This charge creates many difficulties, e.g., in the handling of film on many types of automatic packaging equipment the charged film is attracted to guides, etc. In addition, the accumulation of the static charge results in the attraction of dust to the article. Antistatic compositions heretofore developed for reducing the electrostatic propensity of polymeric surfaces generally adversely effect one or more of the other properties, such as heat sealability, slip, blocking and the like.

It is an object of the invention to provide an antistatic composition.

It is another object of the invention to provide a polymeric structure coated with an antistatic composition.

It is yet another object of the invention to provide a method for reducing the propensity of synthetic thermoplastic polymers to accumulate static electrical charges.

These and other objects of the invention will be readily apparent to one skilled in the art from the following discussion and appended claims.

These objects are broadly accomplished by coating the polymeric surface with an antistatic composition prepared by admixing:

(A) A hygroscopic, water soluble admixture of urea and a salt of an acid, and (B) A wetting agent compatible with (A) and which reduces the surface tension of said polymer.

It has been found that urea associates with salts of acids, although the exact nature of this association is not known. These complex products are referred herein as complexes; however, it is to be understood that they may be only addition or coordination compounds which are readily disassociated into their individual constituents. These complexes of urea and salts have different crystallization points and are generally much more soluble than their individual constituents. The constituents appear to combine in certain well defined molecular ratios.

It has now been surprisingly found that when these hydroscopic, water soluble urea/salt complexes are associated with certain compatible wetting agents a useful antistatic composition results.

Preferred salts are those salts of an acid whose cation is selected from alkali metals such as sodium, potassium and lithium, magnesium, calcium, zinc, manganese, ammonium radicals and the like and whose anion includes the halogens, such as chlorine and bromine, acetate, nitrate, carbonate, thiosulfate, thiocyanate, monohydrogen phosphate radicals and cationic radicals of aliphatic organic acids having from 1 to 4 atoms, inclusive, including formic, ethanoic, propionic, butyric acids and the like.

Suitable salts which are useful in the composition and process of this invention include, but are not limited to, (A) magnesium bromide
(B) sodium propionate
(C) mangesium nitrate
(D) sodium bromide
(E) potassium carbonate
(F) potassium nitrate
(G) lithium chloride
(H) lithium nitrate
(I) sodium thiocyanate
(J) sodium formate
(K) potassium formate
(L) sodium butyrate
(M) potassium butyrate
(N) calcium nitrate
(O) manganese acetate
(P) zinc acetate
(Q) ammonium acetate
(R) aluminum hydroxy diacetate
(S) ammonum chloride
(T) sodium monohydrogen phosphate
(U) potassium acetate
(V) sodium carbonate
(W) sodium nitrate
(X) zinc chloride
(Y) sodium acetate
(Z) sodium thiosulfate
(AA) calcium chloride Particularly preferred salts are sodium nitrate, sodium acetate and potassium acetate.

These urea/salt complexes may be prepared by any suitable means, for example, the constituents may be melted together, or solutions of the individual constituents may be mixed, or urea may be added to a more or less concentrated solution of the salt, or the salt may be added to a more or less concentrated urea solution, or urea and an acid whose salt is to be a constituent of the compound may be mixed and the batch neutralized subsequently with a hydroxide or a carbonate of the metal whose salt is the selected constituent of the compound. It is not necessary that the constituents be in molecular ratios as one or the other may be in excess.

In general, the urea/salt complex is employable over a wide range of concentrations. It is preferred that the urea/salt complex be present in the composition of the invention in an amount ranging from about 0.01 to 20.0, preferably from 0.1 to 2.0, weight percent of the total composition weight including the dispersant when used as described herein or 0.0000013 to 0.00261 gram of urea/salt complex per square inch of polymer surface coated and 0.000013 to 0.000261 gram of urea/salt complex per square inch of polymer surface coated respectively. Although the ratio of urea to the salt is variable over a wide range, such as 0.1 to 10, it is generally preferred that the urea be in excess, preferably at least 1.5, more preferably 2 to 5, mols of urea per mol of salt.

In general, any wetting agent may be employed which is compatible with the employed urea/salt complex and which will reduce the surface tension of the polymer. A small amount of precipitation is not detrimental. By a suitable wetting agent is meant a material which has high degree of affinity to the particular polymer surface to be coated, since it must not only wet the surface by lowering the contact angle of the solution toward the film well below 90°, but must also make possible sufficient spreading of the antistatic solution on the surface to insure electrical conductivity. A convenient method of determining the suitability of the spreading tendency of a surface active agent, is to place a drop of an aqueous solution of the surface active agent on the surface of a film of the polymer under consideration and measure the angle of inclination from the horizontal required to make the drop of solution more, or spread, across the film surface under the influence of gravity. This feat can be readily performed using a "McLaughlin Tilting Platform Tester."

It has been found that the most suitable surface active agent for use in the antistatic solutions of this invention are those which yield aqueous solutions that have very low incline angles on the polymer surface to be coated. The preferred surface active agents are those that yield aqueous solutions having incline angles of less than about 32 degrees, and those having incline angles of 20 degrees or less are particularly preferred. Even lower contact angles, such as 15° or less are usually even better. However, less effective surface active agents which yield aqueous solutions having higher incline angles may be employed, but are more prone to yield antistatic solutions which are difficult or impossible to spread uniformly on polymer film surfaces without streaking or spotting and, in general, larger amounts are needed to cover the surface for satisfactory results.

A particular surface active agent may be unsuitable for use in preparing antistatic coatings for one type polymer, yet it may be completely satisfactory for antistatic coatings to be used on another type polymer. In many instances, particularly when one of the less effective surface active agents is being employed, it is advantageous to treat the surface of the polymer, such as by corona discharge treatment, or otherwise oxidize or modify, to improve its wettability.

Particularly preferred wetting agents are non-ionic and anionic materials, including the $C_5$–$C_{10}$ diesters of sulfosuccinic acid such as sodium dioctyl sulfosuccinate and sodium dihexyl sulfosuccinate, sodium dodecylbenzene sulfonate, the fatty acid esters of polyhydric alcohols such as propylene glycol laurate and polyethylene glycol dilaurate, sodium N-methyl-N-oleoyl taurate, sodium lauroyl sarcosinate and sulfonated red oil. Of these the most preferred is sodium dioctyl sulfosuccinate, because it is quite effective in rather low concentrations.

The wetting agent is employable in the admixture in a wide ratio; however, it is generally preferred that the wetting agent be present in amount ranging from 0.1% to 5.0, preferably from 0.25 to 1.0, weight percent based upon the composition weight including the dispersant, when used as described herein or 0.000013 to 0.00065 gram of wetting agent per square inch of polymer surface coated and 0.0000325 to 0.00013 gram of wetting agent per square inch of polymer surface coated respectively.

The urea/salt complex-wetting agent composition is preferably dispersed in a fluid which permits the application of the composition to the surface of the polymer. It has been found that water is a suitable dispersing agent for the composition since in general, the compounds dissolve in water. However, any fluid may be used which will disperse or dissolve the composition sufficiently so that the dispersion or solution may be applied to the surface without detriment to the surface.

In general, the composition is dispersed or dissolved in the carrier in an amount ranging from 0.1 to 20, preferably from 0.2 to 5.0, weight percent of composition plus dispersant.

It has been found that the composition of the invention is useful for reducing the propensity of the polymeric suface to accumulate an antistatic charge for a wide variety of polymers. In general, the composition is useful for any polymer wetted by the composition. Preferred synthetic thermoplastic polymers include the polymers of the monoolefins having 2 to 8 carbon atoms per molecule including ethylene, propylene, butene-1, pentene-1, hexene-1, heptene-1, octene-1 and mixtures thereof with each other and other copolymerizable monomers having a $CH_2=C<$ group such as divinylbenzene, isopentene, vinylcyclohexene, alkyl benzene, styrene, allyl naphthalene, and the like; 1,1-disubstituted ethylenes such as alphamethyl styrene and the like; 1,2-disubstituted ethylene such as indene, cyclohexene, 2-pentene and the like; conjugated dienes such as 1,3-butadiene, 1,3-pentadiene, cyclopentadiene and the like; unconjugated dienes such as 1,5-hexadiene, dicyclopentadiene and the like; acetylenes, chloroolefins, ethers, and epoxides; esters such as vinyl butyrate, vinyl acetate, and methyl acrylate; and nitrogen compounds such as 4-vinyl pyridene, acrylonitrile and the like. Other suitable polymers are the polyamides (nylon) and the polyvinyl resins including polyvinyl chloride polymers and the copolymers of vinyl chloride and other ethylenically unsaturated monomers including the vinyl esters such as vinyl acetate, vinyl butyrate, vinyl benzoate and the like; the vinyl ethers such as vinyl ether, vinyl chloroethyl ether, vinyl phenyl ether and the like; the vinyl ketones such as vinyl methyl ketone, vinyl phenyl ketone and the like; the vinylidene halides such as vinylidene chloride, 1-fluoro-1-chloroethylene and the like; the acrylic compounds such as acrylonitrile, chloroacrylonitrile, methyl acrylate, methyl methacrylate, 2-ethylhexyl acrylate and the like; the allylic compounds such as allylidene diacetate, chloroallylidene diacetate and the like; and other mono-unsaturated compounds. Preferred polymers are polyethylene, polypropylene, polyamides (e.g., nylon) and copolymers of vinylidene chloride (Saran).

The term polymer as used herein includes homopolymers, copolymers, terpolymers, block copolymers and terpolymers and the like.

In addition, the polymer surface to be treated may be a surface coating of another polymer such as a coating of a copolymer of vinylidene chloride and vinyl chloride on a pellicle.

The composition is effective on any surface of the polymer regardless of shape or form, including films, filaments, rods, tubing, solid structures and the like. In addition, the composition may be applied to one or more surfaces, for example, on film the composition may be applied to only one surface. The polymer may be unoriented or oriented in one or both directions by any suitable expedient such as stretching, inflating or the like prior to treatment. In addition, particularly in the use of films, the polymer may be irradiated prior to orientation such as by the method described in the patents to Baird—U.S. 3,022,543, and Rainer et al.—U.S. 2,877,500. The polymer surface may also be treated such as by corona discharge to oxidize or otherwise modify its surface.

Any suitable method is employable for the application of the composition to the surface of the polymer and it may be applied at any stage of the production of the shaped article, or during the fabrication in any form, or to the finished fabricated article and prior to or during its use. For example, the film or filament may be brought into contact with a wick, roll or felt which has been wetted with a solution, dispersion or emulsion containing the composition. Alternatively, the composition is applied to the article by dispersing the article in a bath containing the same or by spraying, brushing or otherwise.

In many instances, it is unnecessary to remove the fluid composition, particularly at high concentrations; however, when desired, the film may be surface dried so as to remove the water or other dispersing agent. This may be done at any temperature or under any condition not detrimental to the film.

The ultimate goal of an effective antistatic composition is to reduce the propensity of the surface to accumulate an electrostatic charge at the point in its fabrication or use where the surface may be employed or handled satisfactorily. This is best determined by the actual employment of the film or the like under the conditions causing the difficulty. This is, however, a subjective determination and depends to a great extent on the operator's skill and experience. A number of objective methods have been proposed for determining this propensity to accumulate electrostatic charges. For the purposes of this application and the following examples, the measurement of the electrostatic propensity is determined by the use of an electrical resistance tester by the procedure described in AATCC Std. test Method 76–1959. The antistatic solution to be tested was applied to 4 inch strips of film using a #4 wire wound stainless steel rod thereby applying a wet film of 0.80 mil. The film was air dried overnight at room temperature. The electrical resistance was determined after conditioning the film for at least 30 minutes at the percent relative humidity (R.H.) shown in the examples. The electrodes in the tester were ¾ inch by ¾ inch and are ½ inch apart. The upper limit of the scale of tester was 57,000,000 megohms. All reading in excess of this were recorded as 57,000,000.

Although the acceptable upper limit of the electrostatic charge will vary, it is generally considered satisfactory within the meaning of this disclosure, if the resistance of the treated surface does not exceed about 50 million megohms, more preferably not in excess of about 20 million megohms. This value has been found to be generally sufficient for the handling of films in commercial equipment such as bread wrapping machinery.

A particular advantage of the antistatic composition of the invention is that has no detrimental effect under normal usage on other polymer properties such as color, tensile strength or flexibility. In addition, the anti-blocking properties are improved.

It is within the scope of the invention to employ other additives such as lubricants, slip agents, detergents, and the like in the composition of this invention.

The invention is best described by reference to the following examples.

EXAMPLE I

A number of different salts were admixed with urea in a molecular ratio of 1 mole of salt to 2 moles of urea and the admixture dissolved in water to form a 2% solution. The resultant urea/salt solution was then combined with a 2% aqueous solution of the wetting agent to be used. Therefore, each antistatic agent shown in the following Table I contains 1% wetting agent and 1% salt/2 urea complex, unless otherwise specified. A number of 4 inch polypropylene film strips were prepared as hereinbefore described and the electrical resistance determined. A variety of combinations were run but for simplicity they are shown in a single Table I. The salts are listed in the left hand column and the wetting agents employed with the respective salts are listed at the head of each column. The electrical resistance readings are given at reduced values and should be multiplied by 1000: thus $18,000 \times 1000 = 18,000,000$ The control at the bottom of the left hand column was identical to the other runs except that the salt was not used. Control 1 was a sodium dihexyl sulfosuccinate-salt without urea. Control 2 was sulfonated red oil-salt without urea. Only relatively low humidities (R.H.) are shown although identical runs at higher relative humidities produced superior results. The runs were made at about 43° F. It can be seen from line 22, col. 5 that the wet film of coating solution was .80 mil thick and this would be 0.00013 gram of the urea/salt complex per square inch of polymer surface coated and 0.00013 gram of wetting agent per square inch of polymer surface coated.

TABLE I

[Longitudinal resistance, megohms ($\times 10^3$)]

| 1% urea/salt in water salt | Sodium dioctyl sulfosuccinate, 38% R.H. | Sodium dihexyl sulfosuccinate, 33% R.H. | Sodium dodecylbenzene sulfonate, 36% R.H. | Propylene glycol laurate, 28% R.H. | Sulfonated red oil, 28% R.H. | Polyethylene glycol dilaurate, 28% R.H. | Control 1[1], 28% R.H. | Control 2[1], 22% R.H. |
|---|---|---|---|---|---|---|---|---|
| Magnesium bromide 6H₂O | | 18,000 | | .1 | 12 | .1 | 18,000 | 57,000 |
| Sodium propionate | 10 | 2.5 | | 19 | 51 | 105 | 57,000 | 57,000 |
| Magnesium nitrate 6H₂O | 2.5 | 640 | 300 | 3.3 | 195 | 510 | 57,000 | 57,000 |
| Sodium bromide | | | | 1.4 | | 3.3 | 18,000 | 57,000 |
| Potassium carbonate | 1.9 | | 1.9 | 1 | .3 | 3.3 | 57,000 | 16 |
| Potassium nitrate | 30 | 8,700 | 5.7 | 250 | | 740 | 57,000 | 57,000 |
| Lithium chloride | 17 | 330 | 87 | .09 | 25 | .2 | 57,000 | 57,000 |
| Lithium nitrate | .5 | 105 | 250 | .07 | .3 | .2 | 330 | 57,000 |
| Sodium thiocyanate | 51 | 18,000 | | .05 | .7 | 3.3 | 57,000 | 740 |
| Sodium formate | 1.6 | | 1.9 | 7.4 | 19.5 | | 57,000 | 57,000 |
| Potassium formate | .6 | 2,500 | .2 | 0.9 | .3 | 1.4 | 57,000 | 1.8 |
| Sodium butyrate | | 10,500 | | 140 | | | 57,000 | 57,000 |
| Potassium butyrate | 12 | | 33 | .05 | 1.6 | 1.1 | 57,000 | 510 |
| Calcium nitrate H₂O | 10,500 | 1,400 | | | | 275 | 10,500 | 57,000 |
| Manganese acetate | 510 | | | | | | 57,000 | 57,000 |
| Zinc acetate | 13,000 | | | | | | 57,000 | 57,000 |
| Ammonium acetate | 18,000 | | | | | | 57,000 | 57,000 |
| Aluminum hydroxy diacetate | 6,400 | | 6,400 | | | | 27,500 | 57,000 |
| Ammonium chloride | 27,000 | 2,500 | 870 | 140 | | | 18,000 | 57,000 |
| Sodium monohydrogen phosphate H₂O | 300 | | | | 1,050 | | 57,000 | 57,000 |
| Potassium acetate | | | 2.5 | .06 | 2.5 | .9 | 57,000 | 5.1 |
| Sodium carbonate H₂O | 1,800 | | | 110 | | | 57,000 | 57,000 |
| Sodium nitrate | 30 | | 1,330 | 51 | 250 | 25 | 57,000 | 57,000 |
| Zinc chloride | | | 10 | | 5.7 | | 57,000 | 5,100 |
| Sodium acetate | ²·9 | ³1,050 | | 1.9 | 133 | 30 | 57,000 | 57,000 |
| Sodium thiosulfate | | | | 16.2 | 1,300 | | 57,000 | 57,000 |
| Control, 2% urea (no salt) 23% R.H. | 57,000 | 57,000 | 33 | 30 | 57,000 | 57,000 | 57,000 | 57,000 |

[1] Upper limit of instrument was 57,000,000.
[2] 29% R.H.
[3] 29% R.H.

EXAMPLE II

A variety of commercially available wetting agents were employed with either CaCl₂/urea or sodium acetate/urea complexes for polyamide (nylon), vinylidene chloridevinyl chloride copolymer (Saran), polyethylene and polyvinylchloride polymer surfaces. All percents are by weight of an aqueous solution. The results are as follows.

TABLE II

| Surface active agent | Urea/salt complex | Film | Percent R.H. | Temp., °F. | Resistance megohms ×10³ |
|---|---|---|---|---|---|
| 2% sodium N-methyl-N-oleoyl taurate | 0.1% CaCl₂/4 urea | Nylon | 30 | 75 | 18,000 |
| 2% sodium lauroyl sarcosinate | 0.5% 4CaCl₂/urea | do | 30 | 75 | 13,000 |
| 0.25% sodium dioctyl sulfosuccinate | 2% Na acetate/2 urea | Saran | 30 | 75 | 0.87 |
| Do | do | Polyethylene | 30 | 75 | 0.05 |
| 1% sodium dihexyl sulfosuccinate | do | Polyvinyl chloride | 46 | 73 | 0.006 |

It is obvious from the above data that the combination of a wetting agent and a urea/salt complex is effective over wide concentrations for a variety of thermoplastic polymeric materials.

EXAMPLE III

The effectiveness of a number of wetting agents for wetting a polymeric surface was determined by placing a drop of the wetting agent on a smooth surface and determining the angle at which the film could be inclined before the drop would begin to spread on a McLaughlin Tilting Platform tester as hereinbefore described. A polypropylene film was tested both with and without a corona discharge treatment. It will be seen from the following data that such a treatment makes the surface active agent more effective. Effectiveness of the surface active agent varies with the film and salt but it has been found that if the wetting agent or surface active agent has an incline angle of less than about 32, it is particularly effective in combination with the urea/salt complex.

TABLE III

| Surface active agent | Polypropylene | Polypropylene corona treated | Polyethylene, irradiated | Copolymer of vinylidene chloride and vinyl chloride¹ | Polyvinyl chloride² |
|---|---|---|---|---|---|
| Sodium N-methyl-N-oleoyl taurate | 15 | 13 | 13 | 17 | 17 |
| Sodium dihexyl sulfosuccinate | 16 | 8 | 9 | 16 | 9 |
| Sodium dioctyl sulfosuccinate | 18 | 13 | 12 | 18 | 13 |
| Sodium dodecylbenzene sulfonate | 23 | 21 | 18 | 21 | 16 |
| Propylene glycol laurate | 18 | 16 | 16 | 22 | 13 |
| Sulfonated red oil | 21 | 20 | 24 | 25 | 22 |
| Potassium oleate | 20 | 12 | 8 | 17 | 13 |
| Glycerol mannitan laurate | 23 | 19 | 18 | 20 | 14 |
| Propylene glycol 200 dilaurate | 27 | 21 | 20 | 32 | 23 |
| Sodium lauroyl sulfate | 35 | 29 | 23 | 30 | 28 |

¹ Saran.
² Polyvinyl chloride coated on polypropylene.

EXAMPLE IV

The wetting angle of various aqueous wetting agents were determined and compared to combinations of the wetting agent and aqueous urea/salt complexes by the method described in Example III. The film was polypropylene.

TABLE IV

| | Treating Agent | Angle¹ |
|---|---|---|
| Run. Number: | | |
| 1 | 1% sodium dioctly sulfosuccinate | 13° |
| 2 | Run 1 plus 1% Na acetate/2 urea | 13° |
| 3 | 1% propylene glycol laurate | 21° |
| 4 | Run 3 plus 1% CaCl₂/2 urea | 22° |
| 5 | 1% sulfonated red oil | 21° |
| 6 | Run 5 plus 1% Na acetate/2 urea | 20° |
| 7 | 1% sodium lauroyl sarcosinate | 18° |
| 8 | Run 5 plus 1% NaNO₃/2 urea | 17° |
| 9 | 1% sodium lauroyl sulfate | 32° |
| 10 | Run 9 plus 1% Na acetate/2 urea | 31° |
| 11 | Run 9 plus 1% NaNO₃/2 urea | 27° |

¹ Average of 3 readings.

It is apparent from the above data that the "wetting angle" of the combination of the wetting agent and the urea/salt complex was essentially the same as the wetting angle of the wetting agent by itself. This is undoubtedly a factor in the success of the composition of this invention in reducing the propensity of films to accumulate an electrostatic charge. The importance of the wetting ability is further demonstrated by the failure of the sodium lauroyl sulfate to wet the surface. After 24 hours the surface conductivity of polypropylene coated with aqueous solutions similar to Runs 10 and 11 above was greater than 57,000,000 megohms and were considered as unsatisfactory. The relative humidity was 12% at a dry bulb temperature of 75.5° and a wet bulb temperature of 51.5° F.

I claim:
1. A composition useful for reducing the electrostatic propensity of a synthetic polymer surface consisting essentially of,
   (a) a hygroscopic complex of urea and a salt of an acid, the ratio of urea to salt in the range of 0.1 to 10 on a molar basis;
   (b) a wetting agent compatible with (a) which reduces the surface tension of said polymer, the weight ratio of (b) to (a) in the range of 0.1:20 to 5:0.01; and,
   (c) a solvent for the urea salt complex and wetting agent.
2. The composition of claim 1 wherein the salt of (a) is the salt of an acid whose cation is selected from the group consisting of alkali metals, magnesium, calcium, zinc, ammonium and manganese and whose anion is selected from the group consisting of halogen, acetate, carbonate, thiosulfate, thiocyanate, and monohydrogen phospate radicals and radicals of aliphatic organic acids having from 1 to 4 atoms per molecule, inclusive, and wherein the solvent is water.
3. The composition of claim 2 wherein said wetting agent is selected from the group consisting of sodium dioctyl sulfosuccinate, sodium dihexyl sulfosuccinate, sodium dodecylbenzene sulfonate, propylene glycol laurate, sulfonated red oil and polyethylene glycol dilaurate.
4. The composition of claim 2 wherein (a) is present in an amount ranging from 0.1 to 2.0 weight percent based on total composition weight.
5. The composition of claim 2 wherein said wetting agent comprises sodium dioctyl sulfosuccinate.
6. An article of manufacture comprising
   (a) a synthetic polymer substrate having a propensity to accumulate a static charge; and
   (b) a coating on at least one surface of said substrate consisting essentially of
      (1) a hygroscopic complex of urea and a salt of an acid, the ratio of urea to salt in the range of 0.1 to 10 on a molar basis;
      (2) a wetting agent compatible with (1) which reduces the surface tension of said synthetic polymer the weight ratio of (2) to (1) in the range of 0.1:20 to .5:0.01; and,

(3) said coating present in an amount sufficient to reduce the surface electrical resistance and enhance the antistatic properties at the surface of (a).

7. The article of manufacture of claim 6 wherein (1) is present in an amount of from 0.0000013 to 0.00261 gram per square inch of polymer surface coated.

8. The article of manufacture of claim 7 wherein (2) is present in an amount of from 0.000013 to 0.00065 gram per square inch of polymer surface coated.

9. An article of manufacture comprising
   (a) a synthetic polymer having a propensity to accumulate a static charge; and
   (b) a coating on at least one surface of said synthetic polymer consisting essentially of
      (1) from 0.0000013 to 0.000261 gram of a hygroscopic complex of urea and a salt of an acid per square inch of polymer surface coated, the ratio of urea to salt in the range of 0.1 to 10 on a molar basis;
      (2) 0.000013 to 0.00065 gram of a wetting agent compatible with (1) the weight ratio of (2) to (1) in the range of 0.1:20 to 5:0.01; and,
      (3) said coating present in an amount sufficient to reduce the surface electrical resistance and enhance the antistatic properties at the surface of (a).

10. The article of manufacture of claim 9 wherein said salt is water soluble in admixture with urea and wherein said salt is the salt of an acid whose cation is selected from the group consisting of alkali metals, magnesium, calcium, zinc, ammonium and manganese and whose anion is selected from the group consisting of halogen, acetate, carbonate, thiosulfate, thiocyanate, and monohydrogen phosphate radicals and radicals of aliphatic organic acids having from 1 to 4 atoms per molecule, inclusive.

11. The article of manufacture of claim 9 wherein (2) is selected from the group consisting of sodium dioctyl sulfosuccinate, sodium dihexyl sulfosuccinate, sodium dodecylbenzene sulfonate, propylene glycol laurate, sulfonated red oil and polyethylene glycol dilaurate; and is present in an amount of from 0.000325 to 0.00013 gram per square inch of surface coated.

12. The article of manufacture of claim 11 wherein (a) is a polymer of the monoolefins having two to eight carbon atoms per molecule.

13. The article of manufacture of claim 12 wherein the polymer of the monoolefins having two to eight carbon atoms per molecule is polypropylene.

References Cited

UNITED STATES PATENTS

| | | |
|---|---|---|
| 2,086,590 | 7/1937 | Whitehead. |
| 2,290,503 | 7/1942 | Stuewer _____ 117—139.50 |
| 2,334,764 | 11/1943 | Henke et al. _____ 117—139.50 |
| 2,357,380 | 9/1944 | Brant _____ 106—213 |
| 2,597,708 | 5/1952 | Cresswell _____ 252—8.75 |
| 2,614,289 | 10/1952 | Cresswell et al. _____ 18—8 |
| 2,654,678 | 10/1953 | Cresswell _____ 117—139.50 |
| 3,348,968 | 10/1967 | Hulbert et al. |
| 2,074,880 | 3/1937 | Whittaker et al. |
| 2,357,380 | 9/1944 | Brant. |
| 2,597,708 | 5/1952 | Cresswell. |
| 2,614,289 | 10/1952 | Cresswell et al. |

WILLIAM D. MARTIN, Primary Examiner

J. E. MILLER, Jr., Assistant Examiner

U.S. Cl. X.R.

8—115.6; 117—139.5; 252—521, 8.6